(12) United States Patent
Kozlovski (10) Patent No.: US 7,004,666 B2
(45) Date of Patent: Feb. 28, 2006

(54) QUICK-ATTACH AUTOMOTIVE ANTENNA MOUNTING ASSEMBLY

(75) Inventor: A. David Kozlovski, Atkinson, NH (US)

(73) Assignee: Tyco Electronics Corporation, Middletown, PA (US)

( * ) Notice: Subject to any disclaimer, the term of this patent is extended or adjusted under 35 U.S.C. 154(b) by 174 days.

(21) Appl. No.: 10/164,117

(22) Filed: Jun. 5, 2002

(65) Prior Publication Data
US 2003/0068198 A1   Apr. 10, 2003

Related U.S. Application Data

(63) Continuation-in-part of application No. 09/972,807, filed on Oct. 9, 2001, now Pat. No. 6,762,727.

(51) Int. Cl.
*F16B 2/22* (2006.01)
*F16B 7/04* (2006.01)

(52) U.S. Cl. .............. 403/252; 403/197; 403/372; 403/409.1; 343/713; 24/289

(58) Field of Classification Search .......... 24/289–297; 403/187, 195, 197, 247, 252, 392, 374.1–374.3, 403/409.1, 372; 411/54, 508–510, 913, 34; 343/719, 715, 878, 885, 713
See application file for complete search history.

(56) References Cited

U.S. PATENT DOCUMENTS

| | | | | |
|---|---|---|---|---|
| 2,265,179 A | * | 12/1941 | MacDonald | 285/154.3 |
| 2,392,491 A | * | 1/1946 | Moran | 411/54 |
| 2,496,938 A | * | 2/1950 | Friedman | 174/88 C |
| 2,727,766 A | * | 12/1955 | Grashow | 403/197 |
| 2,896,010 A | | 7/1959 | Newman | 174/153 |
| 3,138,660 A | * | 6/1964 | Cejka | 174/153 A |
| 3,138,661 A | * | 6/1964 | Grashow | 174/153 A |
| 3,336,828 A | * | 8/1967 | Granger | 411/913 |
| 3,343,441 A | * | 9/1967 | Van Buren, Jr. | 411/37 |
| 3,789,728 A | * | 2/1974 | Shackelford | 411/34 |
| 4,122,583 A | * | 10/1978 | Grittner et al. | 24/297 |
| 4,136,986 A | * | 1/1979 | Grashow et al. | 403/197 |
| 4,208,944 A | * | 6/1980 | Moryl | 411/34 |
| 4,237,768 A | * | 12/1980 | Volkmann | 85/73 |
| 4,773,280 A | * | 9/1988 | Baumgarten | 403/197 |
| 4,778,320 A | * | 10/1988 | Nakama | 24/297 |
| 5,175,911 A | * | 1/1993 | Terrels et al. | 411/44 |
| 5,507,585 A | * | 4/1996 | Diederich et al. | 403/349 |

(Continued)

FOREIGN PATENT DOCUMENTS

DE        196 40 110 A1    4/1998

(Continued)

OTHER PUBLICATIONS

Office Action dated Sep. 9, 2003; U.S. Appl. No. 09/972,807, filed Oct. 9, 2001, Rochford.

(Continued)

*Primary Examiner*—Robert J. Sandy
*Assistant Examiner*—Ruth C. Rodriguez (57) ABSTRACT

An attachment assembly, useful in quickly attaching an object to a panel, is provided with a base assembly having a shaft member extending therefrom and an expandable member having a plurality of fingers disposed on one side of the panel such that, during installation, the fingers radially outwardly expand to clamp the object to the panel. A process of mounting an object to a panel is also provided. The object is attached to the base of the attachment assembly and the shaft member is positioned in an aperture in a panel. The panel is clamped between the fingers and the base upon installation of the attachment assembly.

20 Claims, 12 Drawing Sheets

U.S. PATENT DOCUMENTS

| | | | |
|---|---|---|---|
| 5,567,074 A | 10/1996 | Dovak et al. | 403/197 |
| 5,624,130 A * | 4/1997 | Ricks | 280/728.2 |
| 5,632,584 A * | 5/1997 | Acevedo | 411/508 |
| 6,039,523 A * | 3/2000 | Kraus | 411/508 |
| 6,236,377 B1 | 5/2001 | Hussaini et al. | 343/882 |
| 6,264,393 B1 * | 7/2001 | Kraus | 24/297 |
| 6,453,796 B1 * | 9/2002 | Rocquet | 92/161 |
| 6,486,841 B1 * | 11/2002 | Imahigashi | 343/715 |
| 6,560,819 B1 * | 5/2003 | Mizuno et al. | 411/508 |
| 6,714,171 B1 | 3/2004 | Haussler et al. | 343/888 |
| 2003/0067182 A1 * | 4/2003 | Rockford et al. | |

FOREIGN PATENT DOCUMENTS

| | | | |
|---|---|---|---|
| EP | 0002654 | 7/1979 | |
| EP | 0008085 | 2/1980 | |
| EP | 0015305 | 9/1980 | |
| EP | 0 133 037 | * 2/1985 | 411/35 |
| EP | 1 120 853 A1 | 8/2001 | |
| FR | 2 575 427 A1 | 12/1984 | |
| FR | 2552936 | 4/1985 | |
| FR | 2575979 | 7/1986 | |
| FR | 2 584 871 | 1/1987 | |
| FR | 2657466 | 7/1991 | |
| FR | 2707801 | 1/1995 | |
| FR | 2 771 858 | 6/1999 | |
| WO | WO 9811624 | 3/1998 | |
| WO | WO 00/35046 | 6/2000 | |
| WO | WO 03/032436 A1 | 4/2003 | |

OTHER PUBLICATIONS

Office Action dated Jun. 4, 2003; U.S. Appl. No. 09/972,807, filed Oct. 9, 2001, Rochford.

Office Action dated Dec. 20, 2002; U.S. Appl. No. 09/972,807, filed Oct. 9, 2001, Rochford.

International Search Report, International application No. PCT/US 02/32162, International filing date Aug. 10, 2002.

* cited by examiner

QUICK-ATTACH AUTOMOTIVE ANTENNA MOUNTING ASSEMBLY

CROSS REFERENCE TO RELATED APPLICATIONS

Applicant claims priority under 35 USC § 120 of and is a continuation-in-part of application Ser. No. 09/972,807, filed Oct. 9, 2001 now U.S. Pat. No. 6,762,727, entitled QUICK-ATTACH, SINGLE-SIDED AUTOMOTIVE ANTENNA ATTACHMENT ASSEMBLY, the disclosure of which is incorporated herein by reference.

STATEMENT REGARDING FEDERALLY SPONSORED RESEARCH OR DEVELOPMENT

N/A

BACKGROUND OF THE INVENTION

In many situations, it is necessary to attach a device to a panel or other support structure. One example is the attachment of an antenna, such as a Global Positioning System (GPS) antenna or cellular antenna to an automobile roof or trunk lid. When such devices are installed on an assembly line, it is important that the device can be accurately and quickly secured to the panel. It is also important that the device be self-contained, so as to eliminate the need for multiple parts or two-handed (or multiple person) operation to install the device. Further, it is important that the installation be as simple as possible with few operational steps. In some applications, there is an additional requirement that the device be properly oriented relative to the panel.

There are numerous known apparatus and processes to attach a device to a panel. In most of those known procedures, the use of both hands, or multiple people, is required for the installation because the device is positioned on one side of the panel and the fastening means is operated from the opposite side of the panel. In addition, most installations of known devices require multiple steps, or the apparatus involves the use of many, often small parts, such as nuts, washers, bolts, screws, or the like. These deficiencies result in a time consuming and awkward installation.

SUMMARY OF THE INVENTION

The present invention provides an attachment assembly that provides quick attachment of an object, such as an automotive antenna unit, to a panel or other support surface, such as an exterior panel of a vehicle. A single worker is able to install the antenna unit or other object with one downward push from the exterior through an opening in the vehicle panel without the need for tools. The attachment assembly also includes an anti-rotation feature to prevent rotation once installed. The attachment assembly can only be removed from the interior, rendering the attachment assembly tamper resistant from the exterior. The attachment assembly can also be mounted on vehicles with various panel thicknesses.

More particularly, the attachment assembly includes a base assembly fixed to an object to be mounted to a panel. The base assembly includes a shaft member that extends through an opening in the panel. An expandable member on the shaft member includes a plurality of resilient members that abut against an interior surface of the panel. The resilient members are compressible to pass through the opening in the panel during installation. A retaining member retains the expandable member on the shaft member with the resilient members in abutment with the interior surface of the panel after installation. A spacer member also disposed on the shaft member biases the expandable member against the retaining member with a gap between the expandable member and the lower surface of the object. The gap is sized to receive the panel of the vehicle after the installation procedure. In this way, panels of various thicknesses can be accommodated by an appropriately sized spacer member. If necessary, a final adjustment can be made to the retaining member after installation. A keying feature is provided between the expandable member and the base assembly to prevent rotation of the attachment assembly.

In a further embodiment, the invention provides an attachment assembly comprising a base member having a mounting stud, a retaining cap disposed on the mounting stud, the retaining cap comprising a plurality of retaining fingers, wherein the retaining fingers cooperate with the stud such that, upon axial movement of the retaining cap toward the base member, the retaining fingers radially outwardly expand and apply clamping pressure against the panel.

In a preferred embodiment, a snap collar is disposed on the mounting stud near the base member, the snap collar having at least one resilient leg aligned along a longitudinal axis of the stud. The leg contacts the interior of the panel to prevent movement of the base away from the panel.

In yet another aspect, the invention provides a process of mounting an object to a panel comprising the steps of attaching an object to an attachment assembly according to the invention and installing the attachment assembly to a panel.

These and other aspects of the invention will become apparent on a further consideration of the specification, drawings and the appended claims.

DESCRIPTION OF THE DRAWINGS

The invention will be more fully understood from the following detailed description taken in conjunction with the accompanying drawings in which.

DETAILED DESCRIPTION OF THE EMBODIMENTS

An antenna attachment assembly 10 according to a first embodiment of the present invention is illustrated more fully in FIGS. 1–5 in conjunction with an antenna unit 12. The attachment assembly 10 is fixed to and extends from the antenna unit 12 and extends through an opening 14 in a panel 16 of a vehicle body. The attachment assembly 10 includes an expandable member 18 that is biased against the interior surface 20 of the panel 16, thereby fixing the attachment assembly 10 and antenna unit 12 to the vehicle, as discussed further below.

In the illustrated embodiments, the antenna unit 12 is illustrated as a radome cover 22 for a GPS or satellite antenna. It will be appreciated that the attachment assembly of the present invention may be used with any type of antenna and associated cover or base unit, such as an AM/FM antenna, or with any other device or object that is intended to be affixed to a panel.

In the illustrated embodiment, the unit 12 has a lower surface 24 that is supported on the exterior surface 26 of the vehicle panel 16 over the opening 14 in the panel. A cable 28 from the unit 12 extends through the lower surface 24 of the unit and through the opening 14 in the panel 16 for connection to other components within the vehicle, as known in the art. A perimeter gasket 30 with an opening 32 therein fits between the lower surface 24 of the unit 12 and the exterior surface 26 of the panel 16. The gasket 30 seals the opening 14 against leaks and compensates for thickness and contour fluctuations in the panel 16. Keying features 34 extend from the unit 12 and the gasket 30 into a smaller opening 36 in the panel 16, as known in the art.

In a first embodiment, the attachment assembly 10 includes a base assembly 40 that is fixed to and extends from the lower surface 24 of the antenna unit 12. The base assembly 40 includes a base plate 42 having a plurality of radially extending tabs 44 located about the circumference of the base plate. The tabs fit within the opening 14 in the panel 16. Three tabs 44 are suitable, although any desired number may be used. The base assembly 40 may be integral with or fixed to the unit 12 in any suitable manner, such as with screws or adhesive. The base assembly 40 also includes an externally threaded hollow shaft 46 extending downwardly from the base plate 42. The shaft includes one or more key slots 48 along its length, discussed further below. The cable 28 from the unit 12 passes through the hollow interior 50 of the shaft 46.

When installed on a vehicle, the base assembly 40 extends through the opening 14 in the panel 16. The expandable member 18, such as a snap ring, fits over the externally threaded shaft 46. A retaining member 54, such as an internally threaded jam nut, retains the expandable member 18 on the base assembly and biases the expandable member against the interior surface 20 of the panel 16. The nut preferably includes a self-locking fastener element 58, such as a polyester or nylon element, applied to the threads at an interior location to prevent slippage, as known in the art. The fastener element should not impede engagement of the nut onto the threads of the shaft.

In the embodiment shown, the snap ring comprises an annular washer portion 60 and a plurality of upstanding, resilient members such as fingers 62 that, in the installed position, expand radially outwardly and at their tips 64 press against the interior surface 20 of the panel 16. The snap ring is preferably stamped and formed from a sheet material having a thickness, hardness, and other properties selected to provide an appropriate amount of resiliency to the fingers, as may be readily determined by those of skill in the art. A metal material, such as a 30 gage stainless steel, is suitable, although an appropriate plastic or composite material may be used if desired. Preferably, a stability washer 66 is provided above and an anti-torsion washer 68 is provided below the annular washer portion 60 to stiffen and support the washer portion and protect the washer portion from distortion. Generally, the washers are stamped from a thicker sheet material than the snap ring, such as a 20 gage stainless steel. Both washers and the snap ring include one or more inwardly facing tabs or keys 70 that align with and fit within the key slots 48 on the threaded shaft 46. When fitted within the key slots, the keys prevent the expandable member 18 from rotating with respect to the unit 12.

The attachment assembly also includes a spacer member 72 such as a compression spring that allows for multiple preset distances to accommodate various panel thicknesses. The compression spring exerts a downward bias on the snap ring against the upward force exerted by the jam nut. The height of the compression spring is set by tightening the jam nut so as to achieve the desired distance or gap (d) between the top of the snap ring fingers and the base plate. Upon installation, the vehicle panel fits within this gap. If necessary, the size of the compression spring may be selected to achieve the desired gap size, depending on the thickness of the panel.

Assembly requires a downward push of the antenna unit 12 and the attachment assembly 10 through the opening 14 in the panel 16. As the attachment assembly is inserted through the opening in the panel, the resilient fingers 62 of the snap ring compress radially inwardly. The tips 64 of the fingers extend within arcuate regions 74 between the tabs 44 of the base plate 42. Once the snap ring passes fully through the opening 14, the fingers spread radially outwardly. The tips of the fingers, which are preferably bent inwardly, abut against the interior surface 20 of the panel 16, thereby locking the attachment assembly place. If necessary, any final adjustments can be made by rotating the jam nut.

Figure 1:
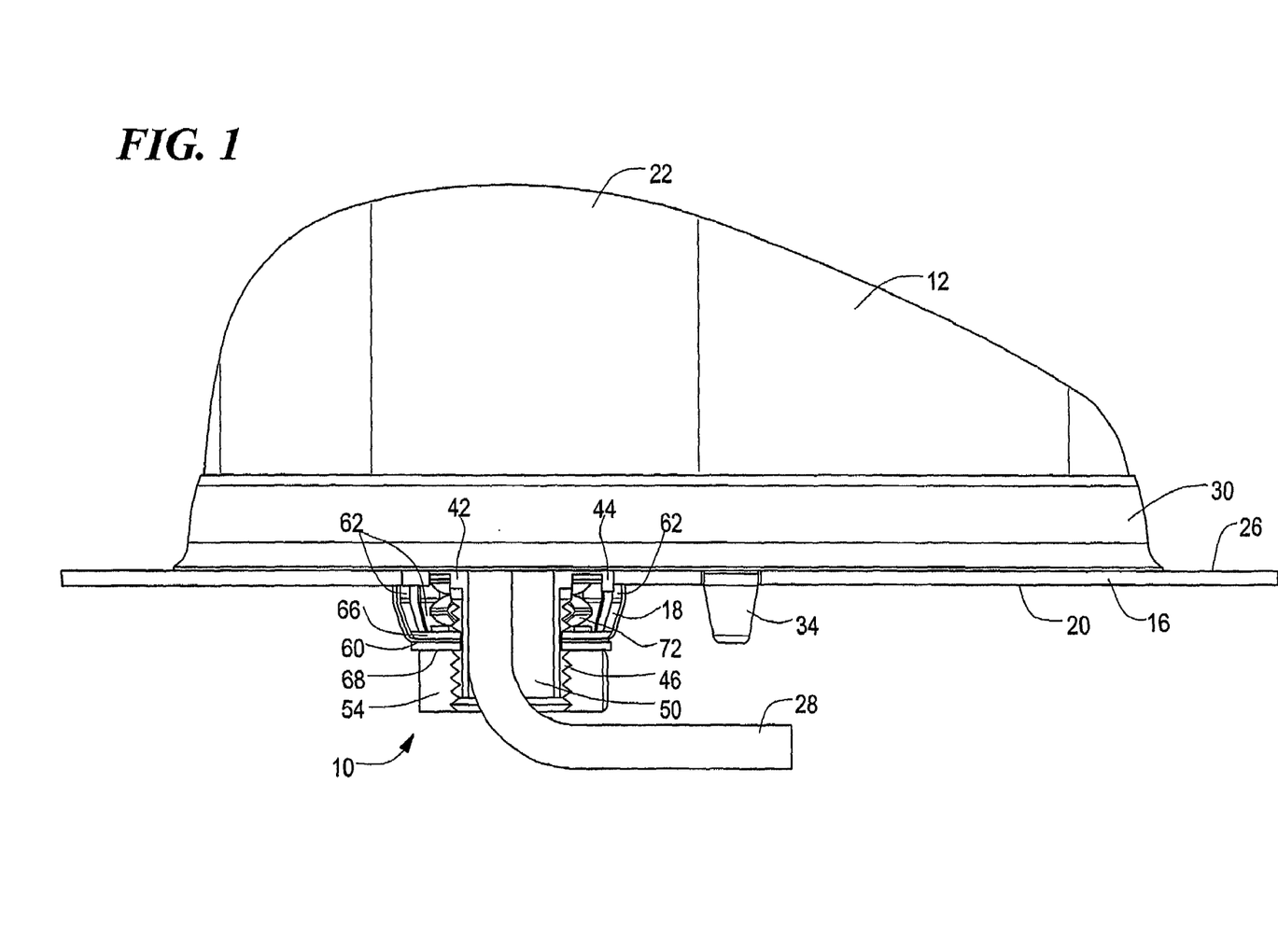
FIG. 1 is a side view of an automotive attachment assembly in conjunction with an antenna unit according to the present invention.
Figure 2:
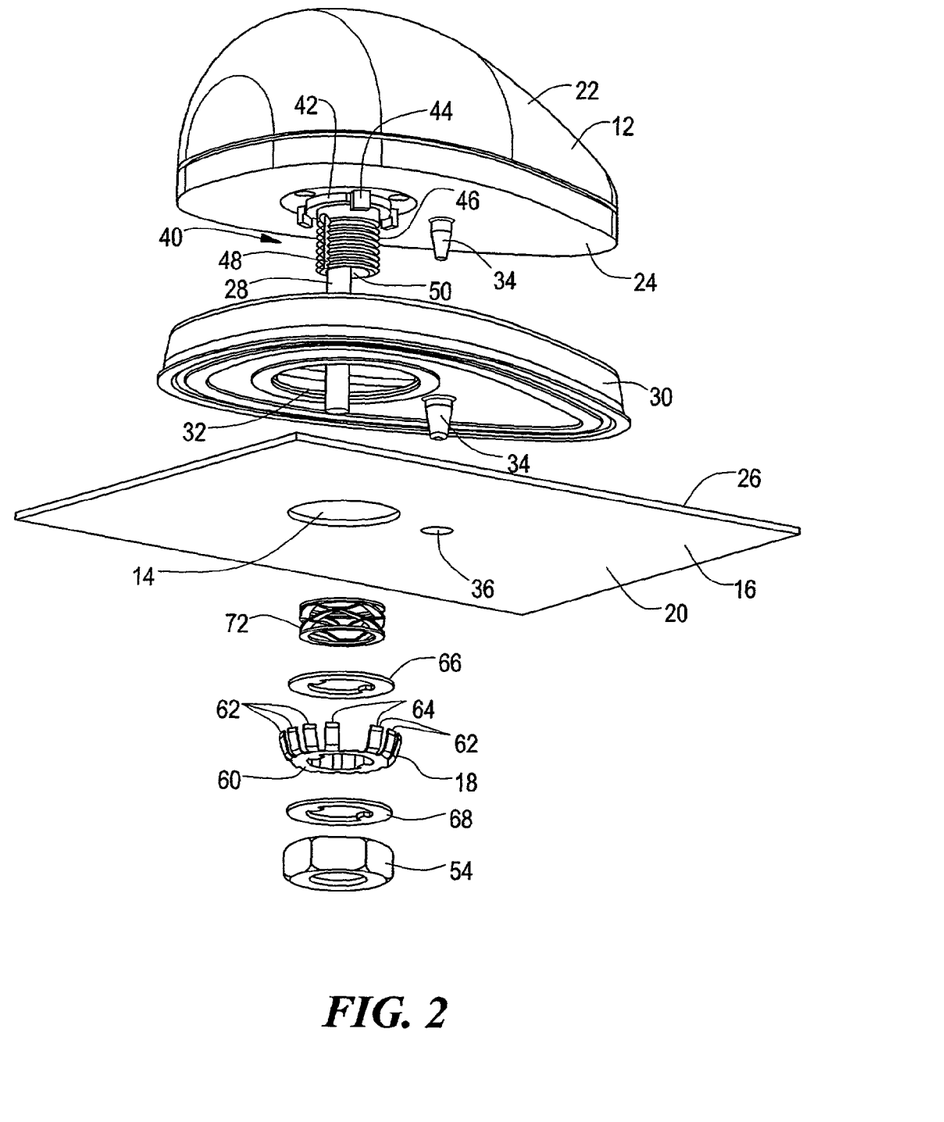
FIG. 2 is an exploded view of the attachment assembly and antenna unit of FIG. 1.
Figure 3:
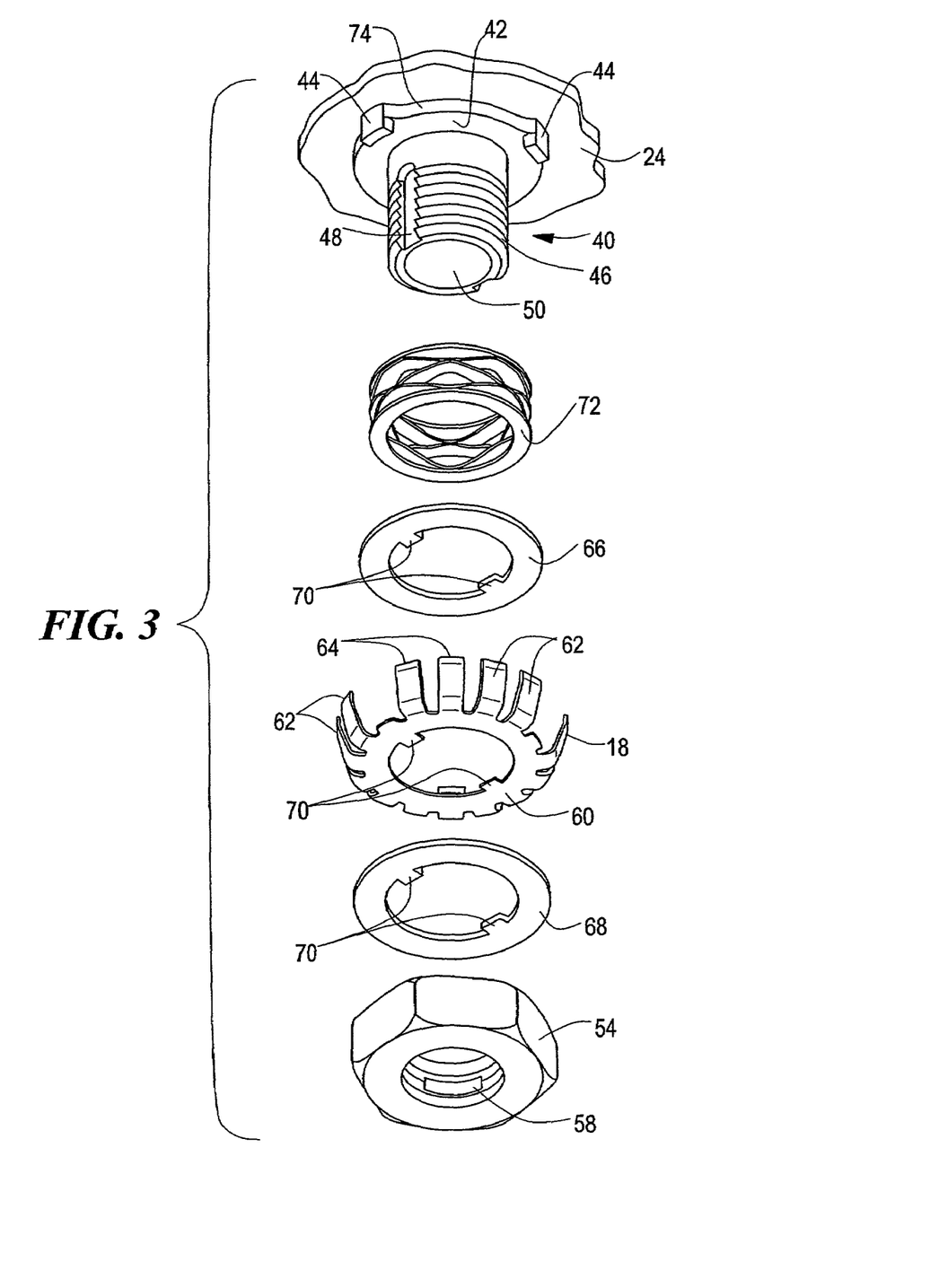
FIG. 3 is an exploded view of the attachment assembly of FIG. 1.
Figure 4:
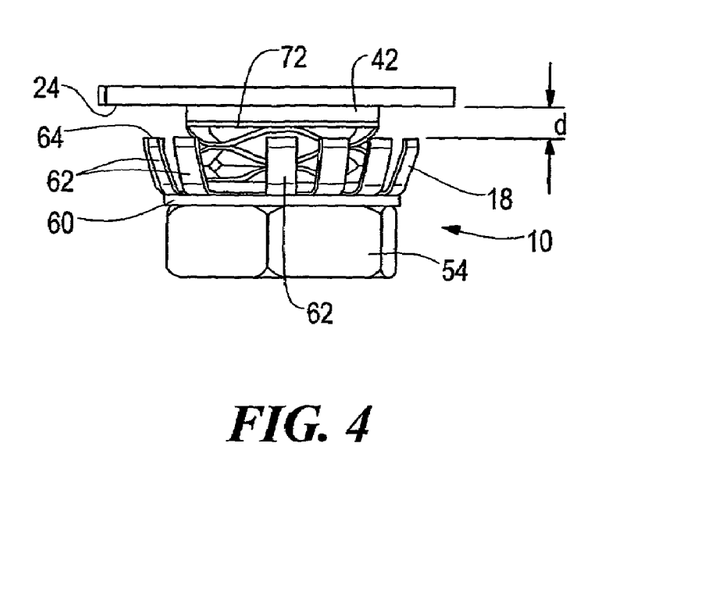
FIG. 4 is a side view of the attachment assembly of FIG. 1.
Figure 5:
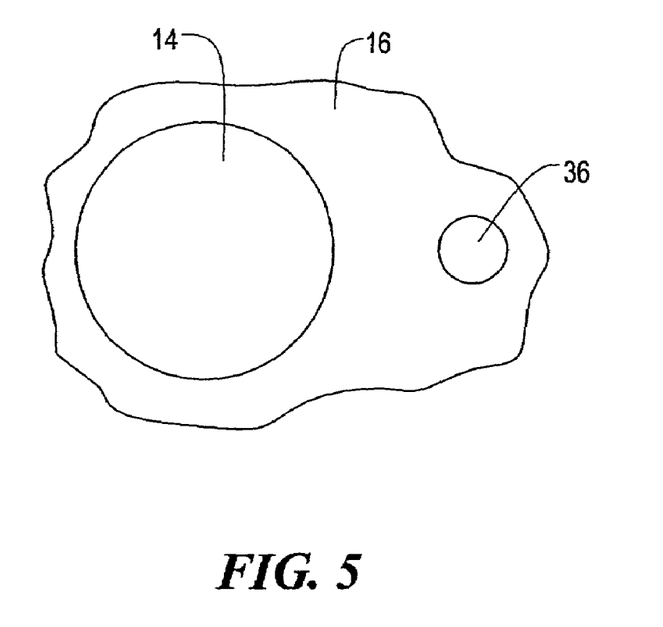
FIG. 5 is a cutaway plan view of a vehicle panel for use with the attachment assembly and antenna unit of FIG. 1.
Figure 6:
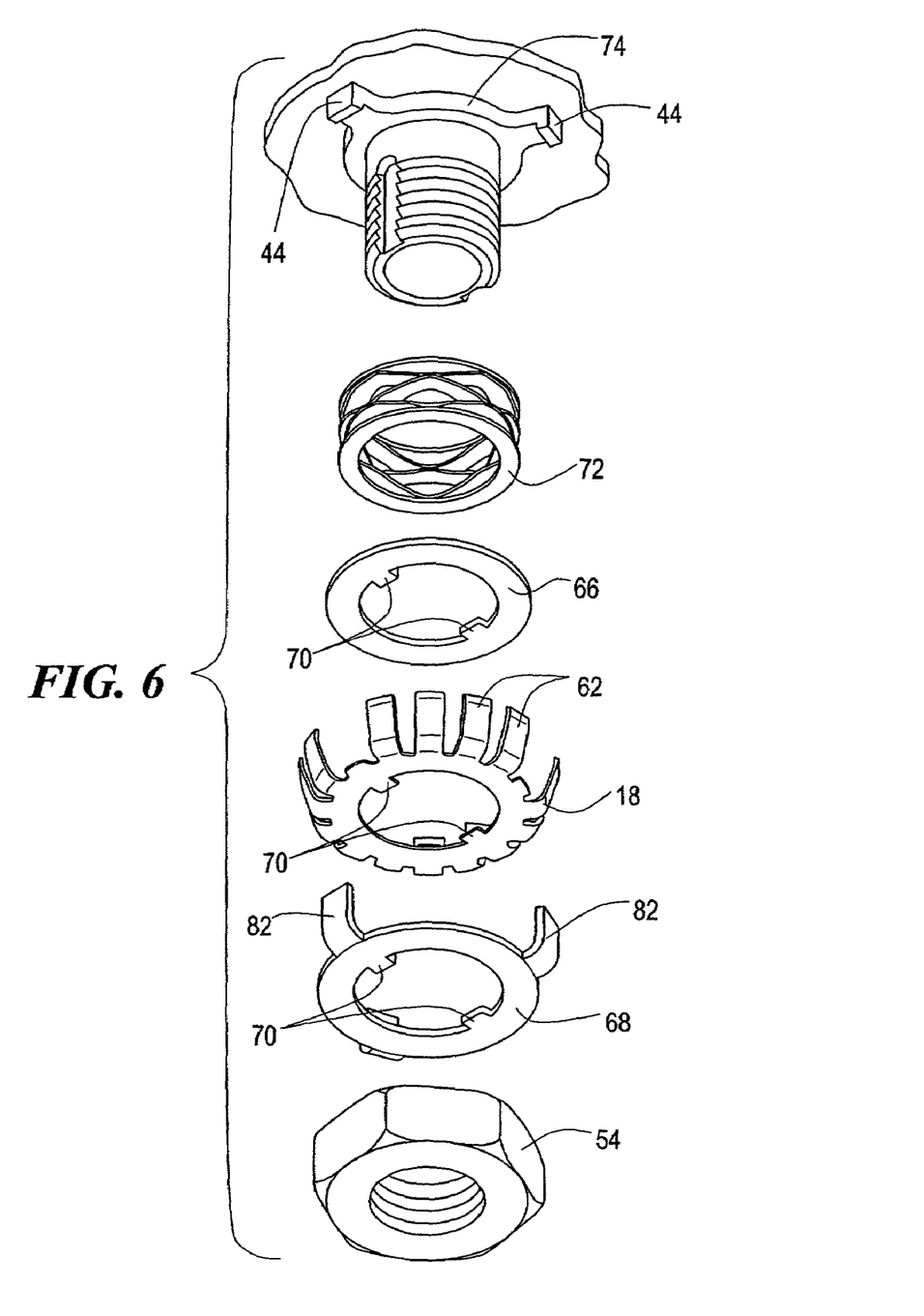
FIG. 6 is an exploded view of a further embodiment of an attachment assembly.
Figure 7:
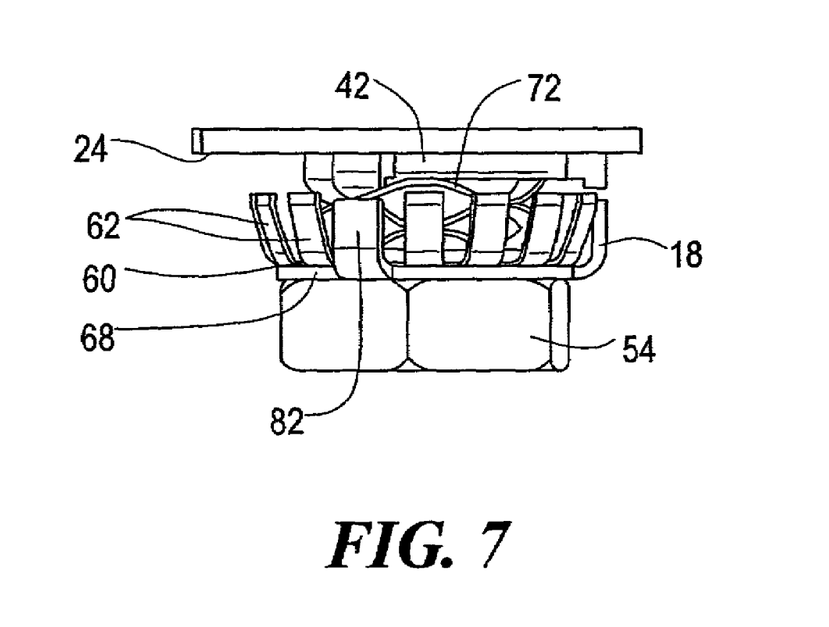
FIG. 7 is a side view of the attachment assembly of FIG. 6.
Figure 8:
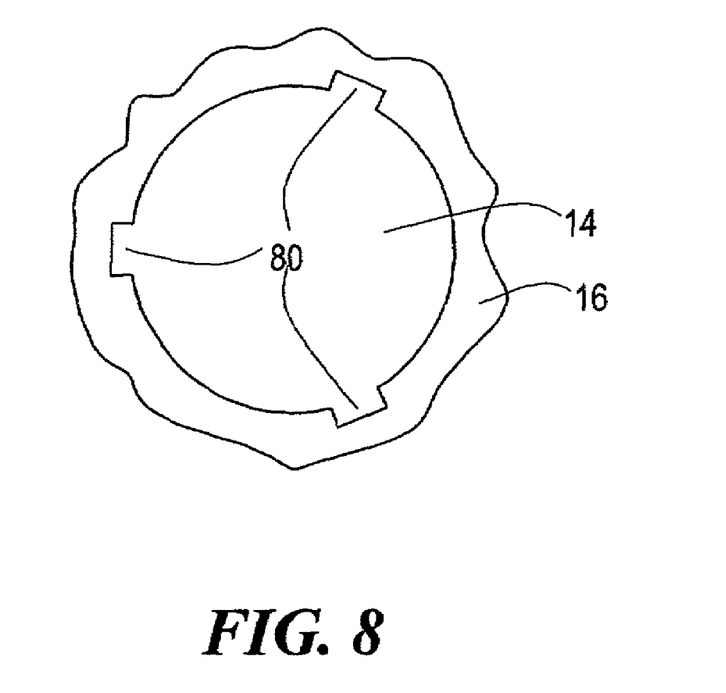
FIG. 8 is a cutaway plan view of a vehicle panel for use with the attachment assembly of FIG. 6.

In a further embodiment, illustrated in FIGS. 6–8, a further anti-rotation keying mechanism is provided. The opening 14 in the panel 16 includes one or more recesses 80 spaced to provide a single orientation. The radially extending tabs 44 on the base plate 42 are aligned with the recesses 80. The tabs fit within the recesses to prevent rotation of the assembly within the opening. Upstanding arms 82 are provided on the lower anti-torsion washer to guide the attachment assembly through the opening 14 during installation. The anti-rotation keying mechanism may be provided in place of or in addition to the keying features 34 utilizing the second opening 36 provided with the antenna unit 12.

A further embodiment of an attachment assembly is shown in FIGS. 9–14D in conjunction with an antenna unit 110 having a lens 112. The attachment assembly includes a base assembly 114 including a base plate 128. A shaft member or mounting stud 116 projects from the bottom of the base plate 128. Preferably, the mounting stud 116 is formed integral with the base plate 128. In use, the mounting stud 116 is disposed in an aperture 101 in a panel 100 (see FIGS. 14A–14D) with the base plate 128 placed against the outer surface of the panel. A threaded stud 126 projects from the mounting stud 116. Disposed over the mounting stud 116 are an expandable member, such as a retaining cap 122, and a spacing member, such as a snap collar 120. These elements, in combination with a retaining member, such as a nut 124 on the threaded stud 126, cooperate to secure the base assembly 114 to the panel 100, as is explained in greater detail below.

In the embodiment shown, the plate 128 is provided with a plurality of openings 129. These openings facilitate attachment of the plate 128 to the object being mounted, such as the antenna lens 112 illustrated. The number, size and location of such openings are determined based on the particular application. In some applications, such as in certain automobile antennas, it is necessary or desirable to properly orient the device relative to the panel. In such circumstances, a keying feature such as an orientation stud 117 may be provided on the base assembly that projects through a suitable aperture 102 in a panel 100.

A gasket 118, shown in FIGS. 9 and 14A–14D, is disposed against the bottom surface of the base plate 128. The gasket 118 seals the base assembly 114 to the panel 100. The gasket 118 may not be required or desirable in all applications. It is particularly desired to employ a gasket in automotive applications or other applications where the exterior of the panel is exposed to the out of doors. Any suitably shaped gasket 18 of suitable material may be employed to advantage. When the attachment assembly of the invention is affixed to a panel, the gasket 118, if used, is compressed between the panel and the base plate 128. Accordingly, the materials and design of the gasket 118 are selected to permit such compression to occur.

Figure 10:
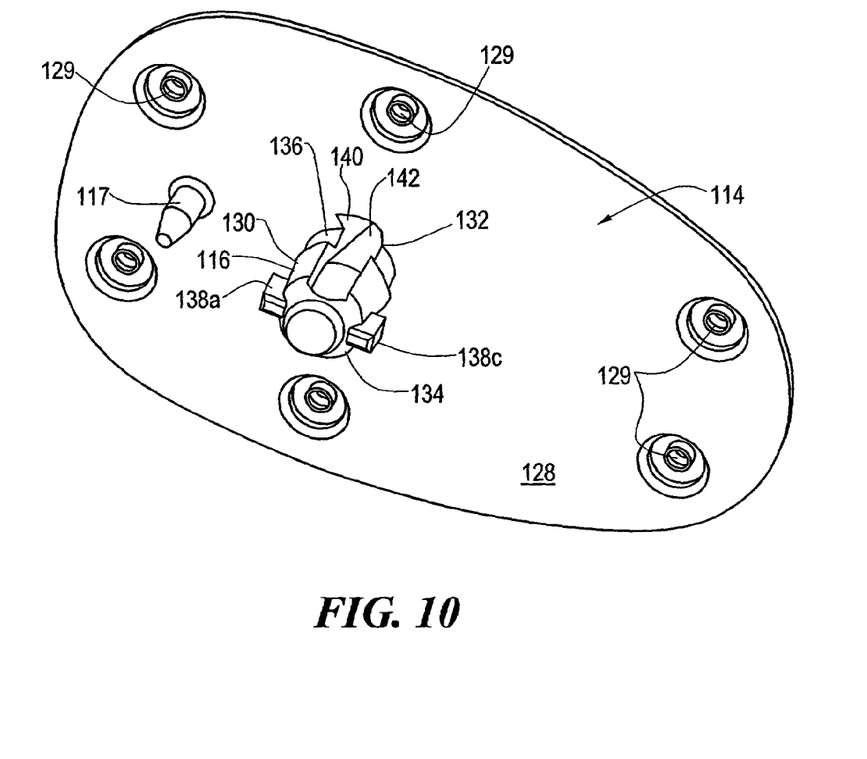
FIG. 10 is a perspective view of the underside of the base of the attachment assembly of FIG. 9.

Referring FIG. 10, the base plate 128 as illustrated has an egg or oval shape with the mounting stud 116 located in approximately the center of the plate 128. For clarity, the threaded stud 126 of mounting stud 116, nut 124, and retaining cap 122 are not shown in FIG. 10. The size and shape of the plate and position of the mounting stud are determined by the intended use. It is most preferred that the plate 128 have generally the same contours of the panel to which it is to be attached to provide a smooth, tight contact between the panel and the base plate (or gasket where a gasket is employed). Thus, if the base assembly were intended to be attached to a curved panel, the base plate would be designed with the same curvature as the curved panel. Preferably, the base assembly 114 is of die cast construction, although the invention is not limited thereto. Machined or molded constructions can also be used to advantage.

Figure 11:
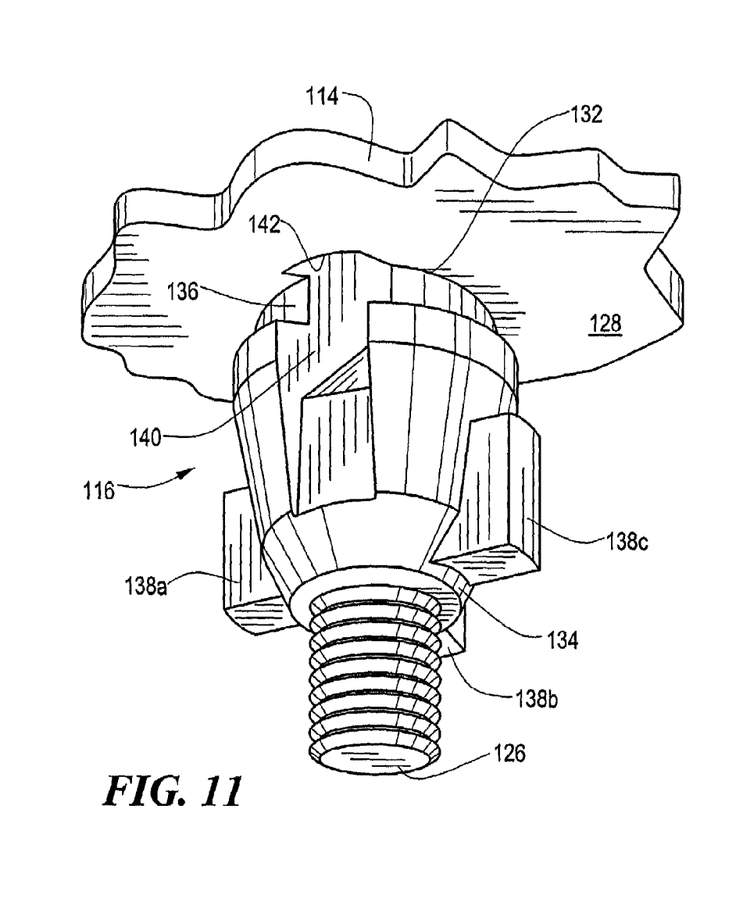
FIG. 11 is an isometric view of the mounting stud of the attachment assembly of FIG. 9.

With particular attention to FIGS. 10 and 11, the mounting stud 116 is a generally cylindrical shaped member having a centrally located body section 130 disposed intermediate the base 132 of the stud (that is, the point where the mounting stud 116 emerges from the base plate 128) and the tip 134 of the stud 116. The body section 130 forms an annular recess or notched area 136 at the base 132 of the stud 116, as best seen in FIG. 11. The body section 130 is tapered or flared outwardly from the tip 134 toward the base 132 of the stud 116, such that the diameter of the body 130 is greatest where the body section 130 joins the annular recess 136. The tip 134 of the stud 116 is beveled or chamfered toward the threaded stud 126. As such, the mounting stud, when viewed in cross-section, has a double bevel configuration.

The mounting stud 116 is also provided with at least one boss member 138 outwardly projecting from the stud 116. In a preferred embodiment, as shown in FIG. 11, the stud 116 is provided with three such boss members 138a, 138b and 138c, one positioned in each of three quadrants along the circumference of the stud 116. The remaining quadrant of the stud 116 contains a notch 140 that is oriented along the longitudinal axis of the stud 116. The notch 140 is coextensive with a through-hole 142 in the base plate 128. The notch 140 and through-hole 142 permit electrical wiring or coaxial cables or other necessary electromechanical connections to be made to the antenna or other device being attached to the panel. Of course, if no such connections are needed, the notch 140 and through hole 142 can be eliminated. Additional notches may be provided in the body section 130 and longitudinally aligned with bosses 138a and 138c, which are located on opposite sides of the body section 130 of stud 116. See, for example, the notches 144 aligned with bosses 138a and 138c in FIG. 9.

Figure 9:
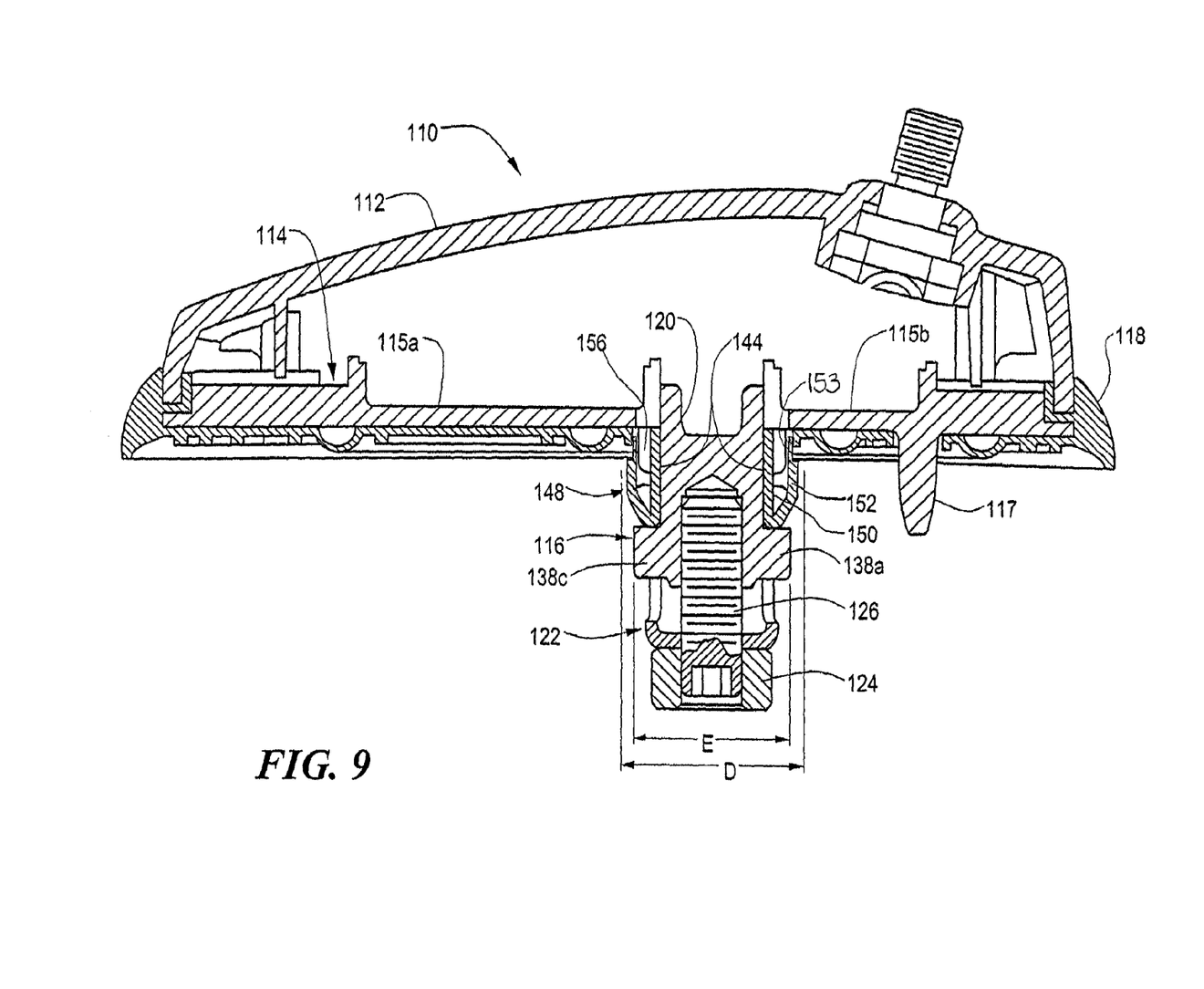
FIG. 9 is a sectioned elevation view of a further embodiment of an attachment assembly according to the invention.
Figure 12A:
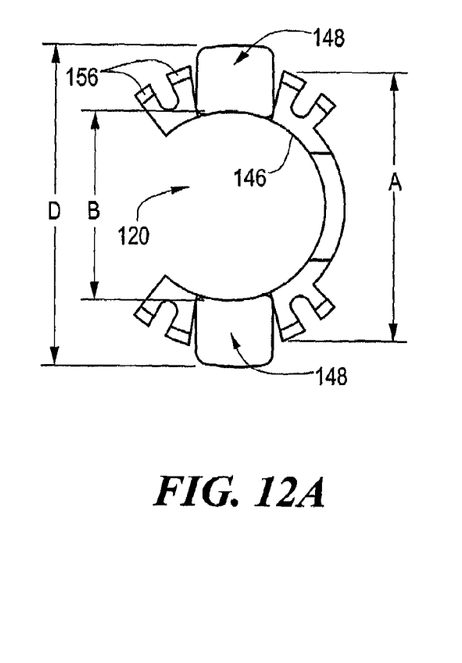
FIG. 12A is plan view of the snap collar of the attachment assembly of FIG. 9.
Figure 12B:
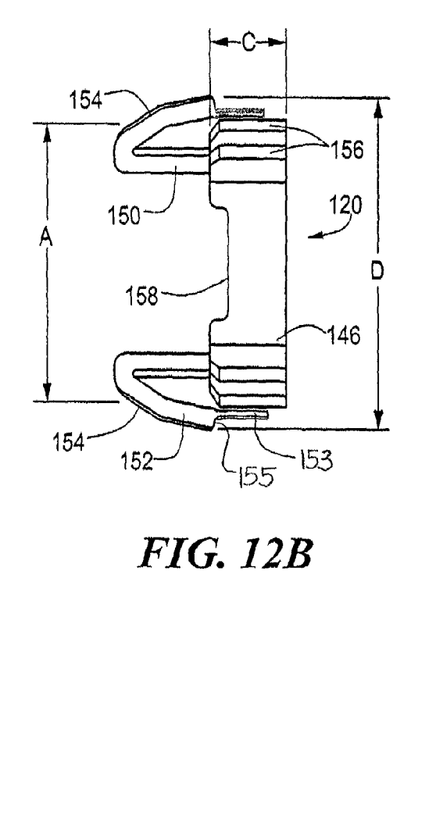
FIG. 12B is a side elevation view of the snap collar of FIG. 12A.

The snap collar 120 is shown in FIGS. 12A and 12B. The snap collar 120 comprises a split ring portion 146 having a pair of resilient legs 148 extending therefrom in a direction generally perpendicular to the plane of the split ring portion 146. The legs 148 are spaced approximately 180 degrees from one another. Each of the legs 148 comprises a straight section 150 and a cantilever section 152. A tab 153 extends from each cantilever section, forming a notch surface 155 with the cantilever section. The cantilever section 152 of each leg 148 is resiliently movable toward straight section 150 such as, for example, when the stud 116 is inserted into an aperture in a panel, and then returns to its neutral position. Cantilever sections 152 have an angular or beveled portion 154 to facilitate insertion of the cantilever sections through an aperture in a panel. The tabs 153 remain within the aperture, preventing the cantilever sections 152 from folding outwardly and downwardly, and the notch surface 155 catches on the edge of the panel, preventing the legs 148 from passing into the aperture, as best illustrated in FIG. 9.

The split ring section 146 of the snap collar 120 is also provided with outwardly oriented spacing lugs 156 that facilitate centering the stud 116, and thus plate 128, in the panel aperture. The dimension A across the snap collar 120 at the spacing lugs 156 is determined to closely correspond to the diameter of the aperture in the panel through which the stud 116 is to be disposed. The interior diameter B, as well as depth C, of the split ring section 146 is determined by the size of the recess 136 in the stud 116. The distance D across the snap collar 120 between cantilever sections 152 is selected to be slightly larger than the distance E across the stud 116 at opposing bosses 138a, 138c (see FIG. 9). In a particularly preferred embodiment, the dimensions A and E are the same.

The split ring section 146 of the snap collar 120 may be provided with a notched section 158 of reduced depth aligned with the notch 140 of stud 116. The notched section 158 is particularly desired when the device being mounted requires electrical wires or other connections to pass through the panel and provides clearance for such wires or connections.

Figure 13A:
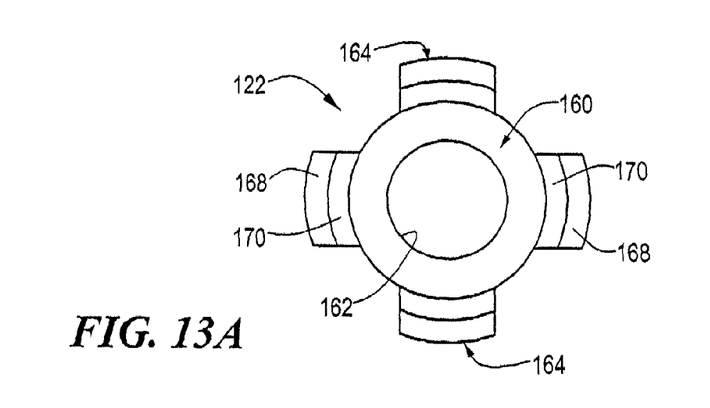
FIG. 13A is a plan view of the retaining cap of the attachment assembly of FIG. 9.
Figure 13B:
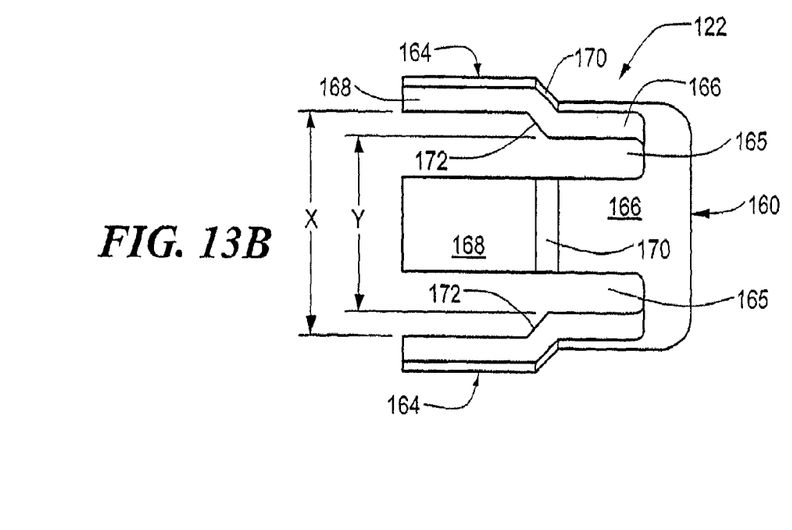
FIG. 13B is a side elevation view of the retaining cap of FIG. 13A.
Figure 14A:
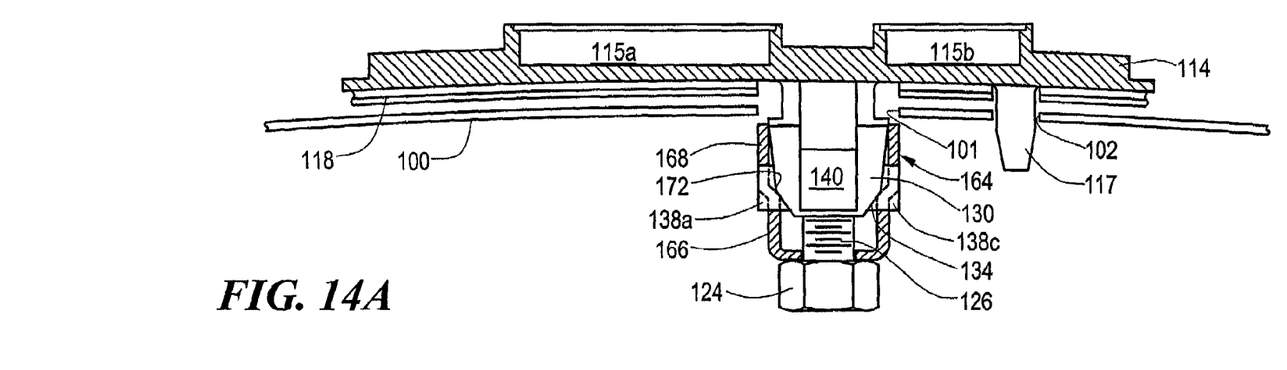
FIGS. 14A through 14D are a series of partial cross-sectional views of the attachment assembly particularly illustrating the process of attaching an object to a panel.
Figure 14B:
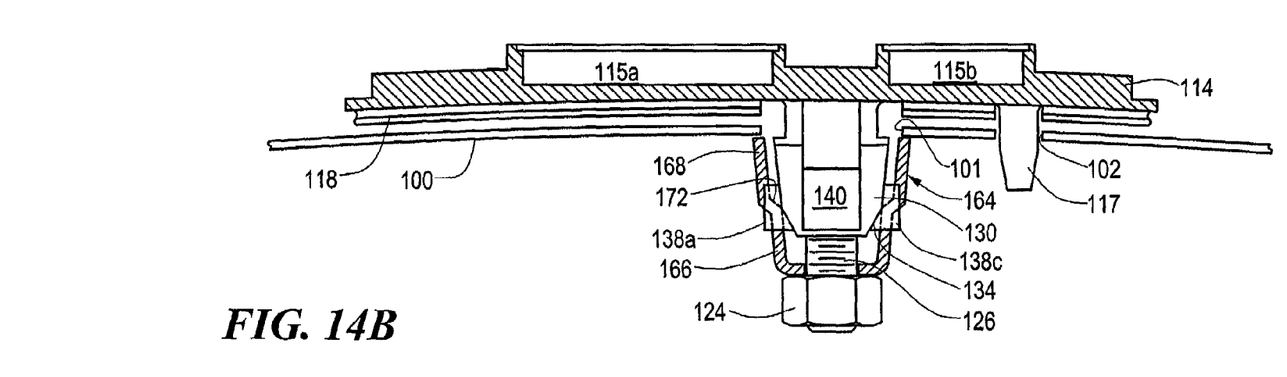
Figure 14C:
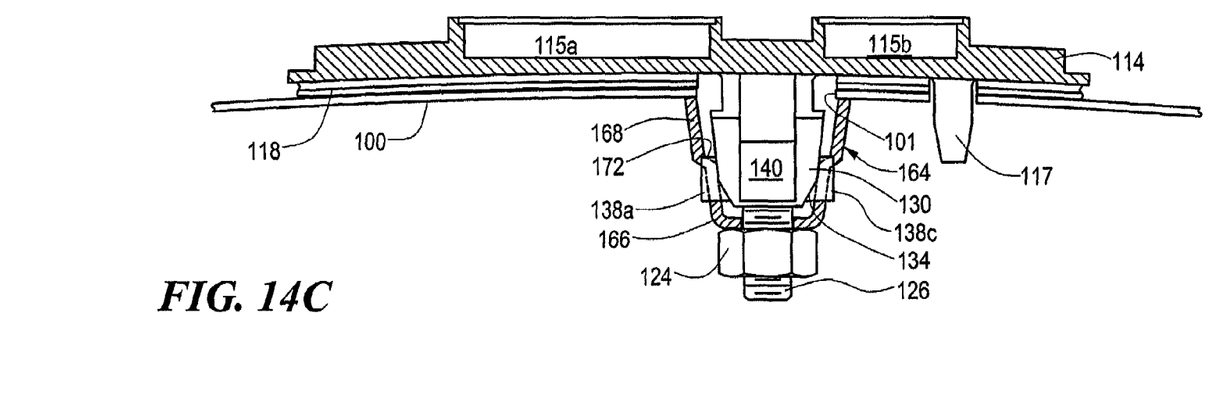
Figure 14D:
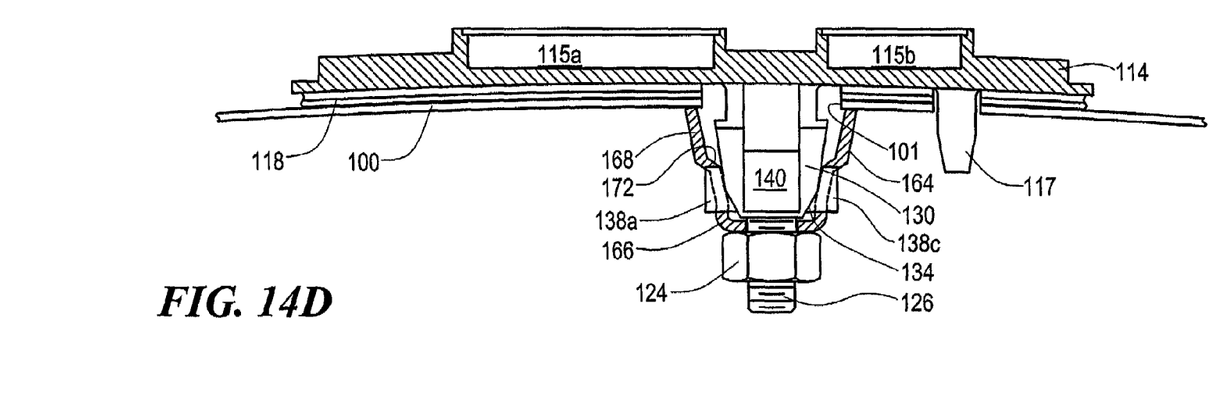

The retaining cap 122 is shown in FIGS. 13A and 13B. The retaining cap 122 is preferably of stamped and formed metal construction, and comprises a top section 160 having a central aperture 162 which is sized to receive therein the threaded stud 126. The top section is circular in plan. A plurality of spaced apart fingers 164 are attached to the top section 160 and extend at a generally right angle to the plane of the top section 160 to provide the retaining cap 122 with an overall tubular appearance. In the preferred embodiment shown, four fingers 164 are provided, equally spaced about the circumference of the top section 160, and separated by slots 165.

As best seen in FIG. 13B, the fingers 164 have an upper section 166 and a lower section 168. The upper section 166 is joined to the lower section 168 via intermediate section 170. The intermediate section 170 is outwardly angled, such that the lower portions 168 of fingers 164 are radially outwardly spaced relative to upper portions 166 and the top section 160. The angled orientation of intermediate section 170 also forms a beveled shoulder 172 on the inner surface of the fingers 164. The distance X between fingers 164 disposed on opposite sides of the retaining cap 122 is selected to be slightly larger than the diameter of the body section 130 of stud 116, whereas the distance Y between the upper surfaces 66 of opposing fingers 164 is smaller than the diameter of the body section 130. Accordingly, when the retaining cap 122 is positioned over stud 116, the interior of lower portions 168 of the fingers 164 will be touching, or very nearly touching the exterior surface of the body section 130 of the stud 116 and the beveled shoulder 172 will be resting on the beveled tip 134 of the stud 116. The width of the slots 165 that separate the fingers 164 is sufficient to permit receipt of the boss members 138a–138c of the mounting stud 116 therein.

Reference is now made to FIGS. 14A–14D, which illustrate the action of the retaining cap. In these figures, some of the details and components of the invention have been omitted to simplify the illustrations. In use, the device being mounted to the panel 100 is attached to the base assembly 114. The manner of attachment is not important. The snap collar 120 (not shown in FIGS. 14A–14D) is positioned around the stud 116, as described above. The retaining cap 122 is also positioned around the stud 116 such that the beveled shoulder 172 is resting on the beveled tip 134 and the boss members 138a, 138b, and 138c are positioned in respective slots 165 of the retaining cap 122. The nut 124 is loosely threaded onto the threaded stud 126 and, if desired, a gasket 118 is employed.

The entire assembly is then attached to the panel 100 by inserting the stud 116 through the panel aperture 101. If present, the orientation stud 117 will be disposed through panel aperture 102. Continued movement toward the panel 100 will cause the resilient legs 152 of the snap collar 120 (not shown) to retract and then expand to their neutral position once they have cleared the interior surface of the panel. The snap collar functions as a temporary holding mechanism while the assembly is being installed. When in the neutral position, the legs 152 contact the interior surface of the panel 100 and prevent the base assembly 114 and the device mounted thereon from moving away from the panel 100. The retaining legs 152 do not exert any appreciable clamping force against the panel.

From the interior of the panel 100, torque is then applied to the nut 124. The nut 124 then travels toward the panel 100 along the threaded stud 126, which in turn forces the retaining cap 122 to move axially toward the base 114 and the panel 100. As the retaining cap 122 moves toward the base assembly 114 and the panel 100, the lower portion 168 of the fingers 164 will radially outwardly expand as the beveled shoulder 172 contacts first the beveled tip 134 of the stud 116, and then the tapered body 130 of stud 116. The boss members 138a–138c prevent the retaining cap 122 from rotating relative to the stud 116 as torque is applied to the nut 124.

The radial expansion and axial movement of fingers 164 of the retaining cap 122 toward panel 100 result in the lower portion 168 of the fingers 164 contacting the inner surface of the panel 100. The snap collar 120 also functions to space the retaining cap 122 a sufficient distance from the panel 100 such that the fingers 164 of the retaining cap cannot enter into the aperture 101. This process continues until a predetermined amount of torque has been applied and the panel 100 is firmly clamped between the retaining cap 122 and the base member 114. In a preferred embodiment, the boss members 138a through 138c of the stud 116 cooperate with the slots 165 of retaining cap 122 to stop the movement of the retaining cap 122 toward panel 100, and thus prevent the application of too much torque, which might damage either the panel 100, the device, or both.

The internal electronics of the antenna units shown herein are not critical to the invention, and thus they are not described in any detail. It is, however, a feature of the invention that the base assembly may be configured to accept such electronics or other desired components based on the intended use of the quick-attachment mounting mechanism. For example, referring to FIG. 9, the base assembly 114 may be provided with recesses, wells, partitions, or compartments, such as compartments 115a and 115b to accommodate the components of the device being mounted to the panel using the invention.

It will be appreciated that other variations of the above embodiments are possible. For example, the expandable member and the retaining member may be formed as an integral member. The invention is not to be limited by what has been particularly shown and described, except as indicated by the appended claims.

What is claimed is:

1. An attachment assembly for attaching an object to a panel of a vehicle comprising:
   a base assembly fixable to the object, the base assembly including a shaft member extending therefrom; and
   a retaining mechanism insertable through an aperture in the panel, the retaining mechanism comprising:
      an expandable member comprising a plurality of resilient, outwardly expandable fingers adapted to pass through the aperture in the panel and adapted to engage an inner surface of the panel,
      a retaining member disposed on the shaft member to bias the expandable member toward the panel, and
      a spacer member disposed on the shaft member to space the expandable member a selected distance from the object, wherein the shaft member extends through an opening in the panel and comprises a stud having a tapered body section with at least one boss outwardly extending from the tapered body section and positioned between any two adjacent fingers of the expandable member, and wherein the fingers are in contact with the tapered body section.

2. The attachment assembly of claim 1, wherein the expandable member comprises a retaining cap disposed for axial movement on the shaft member.

3. The attachment assembly of claim 1, wherein the fingers of the expandable member comprise an upper section and a lower section joined by an intermediate section, the intermediate section angled such that the lower sections of any two opposing retaining fingers are spaced farther apart than the upper sections of said opposing fingers.

4. The attachment assembly of claim 1, wherein the expandable member comprises an annular portion, the fingers upstanding from the annular portion.

5. The attachment assembly of claim 1, wherein the spacer member comprises a snap collar disposed about the shaft member, the snap collar having at least one resilient leg positioned adjacent the base assembly.

6. The attachment assembly of claim 5, wherein the snap collar comprises a split ring portion having a pair of opposed resilient legs extending therefrom, the legs comprising a straight section and a cantilevered section, an edge of the cantilevered section positioned adjacent the base assembly.

7. The attachment assembly of claim 6, wherein the legs further include a tab extending from the cantilevered section, the tab positioned within the aperture.

8. The attachment assembly of claim 1, wherein the retaining member comprises a nut threadably disposed on the shaft member.

9. The attachment assembly of claim 1, wherein the retaining member comprises means for effecting axial movement of the expandable member toward the panel.

10. The attachment assembly of claim 1, wherein the retaining member comprises a threaded member attached to the shaft member and a nut threadably disposed on the threaded member, wherein upon application of torque to the nut, the expandable member moves toward the panel.

11. The attachment assembly of claim 1, further comprising a gasket member disposed against the base assembly.

12. A process of mounting an antenna unit to a panel, the process comprising:
attaching the antenna unit to a quick-attachment mounting mechanism, said quick attachment mounting mechanism comprising:
a base having a stud extending therefrom, said stud having a tapered body section; and
a retaining cap disposed on said stud for axial movement relative thereto, said retaining cap comprising a plurality of retaining fingers in contact with the tapered body section of said stud, wherein upon axial movement of said retaining cap toward said base, the retaining fingers radially outwardly expand;
inserting the stud through an aperture in a panel and positioning the base against an exterior surface of the panel; and
effecting axial movement of said retaining cap to clamp the panel between said plurality of retaining fingers and said base.

13. The process of claim 12, wherein the quick-attachment mounting mechanism further comprises a snap collar disposed about said stud, said snap collar having at least one resilient leg positioned adjacent said base, wherein upon insertion of said stud through said aperture, said resilient leg moves toward said stud and then returns to its neutral position to prevent the base from moving away from the panel.

14. The process of claim 13, wherein said snap collar comprises a snap ring portion having a pair of resilient legs extending therefrom, said legs being spaced 180° apart, each said resilient leg being disposed in a respective notch in said tapered body section and aligned with a longitudinal axis of said stud.

15. The process of claim 12, wherein said quick-attachment mounting mechanism further comprises means for effecting axial movement of said retaining cap toward said base.

16. The process of claim 15, wherein said means for effecting axial movement of said retaining cap comprises a threaded member attached to said stud and a nut, and wherein step c) comprises applying torque to said nut to effect axial movement of said retaining cap toward said base until a pre-determined amount of clamping force is applied.

17. The process of claim 12, wherein said stud is provided with a longitudinal notch aligned with a through hole in the base.

18. The process of claim 12, wherein the stud of said quick-attachment mounting mechanism is provided with at least one boss outwardly extending from said tapered body section, said boss being positioned between any two adjacent retaining fingers of said retaining cap.

19. The process of claim 12, wherein said retaining fingers comprise an upper section and a lower section joined together by an intermediate section, said intermediate section being angled such that the lower sections of any two opposing retaining fingers are spaced farther apart than the upper sections of said opposing fingers.

20. The process of claim 12, further comprising the step of positioning a gasket between the base and the panel prior to insertion of the stud in the panel aperture.

* * * * *